(12) United States Patent
Spay et al.

(10) Patent No.: US 11,549,918 B2
(45) Date of Patent: Jan. 10, 2023

(54) ULTRASONIC SCANNER WITH INTERCHANGEABLE WEDGE AND FLEXIBLE PROBE

(71) Applicant: OLYMPUS AMERICA INC., Center Valley, PA (US)

(72) Inventors: Benjamin Spay, Quebec (CA); Simon Alain, Quebec (CA); Martin Dupuis, Quebec (CA); Sylvain Sauvageau, Levis (CA); Francois Houde, Quebec (CA)

(73) Assignee: Olympus America Inc., Center Valley, PA (US)

( * ) Notice: Subject to any disclaimer, the term of this patent is extended or adjusted under 35 U.S.C. 154(b) by 220 days.

(21) Appl. No.: 16/164,597

(22) Filed: Oct. 18, 2018

(65) Prior Publication Data

US 2019/0128856 A1    May 2, 2019

Related U.S. Application Data

(60) Provisional application No. 62/578,050, filed on Oct. 27, 2017.

(51) Int. Cl.
  *G01N 29/265*    (2006.01)
  *G01N 29/24*    (2006.01)
  (Continued)

(52) U.S. Cl.
  CPC ......... *G01N 29/265* (2013.01); *G01N 29/225* (2013.01); *G01N 29/226* (2013.01);
  (Continued)

(58) Field of Classification Search
  CPC ..... G01N 2291/0289; G01N 2291/106; G01N 2291/2634; G01N 2291/2638;
  (Continued)

(56) References Cited

U.S. PATENT DOCUMENTS

| | | | | |
|---|---|---|---|---|
| 3,568,049 A | * | 3/1971 | Barton | G01N 27/9006 |
| | | | | 324/262 |
| 4,195,530 A | * | 4/1980 | Ross | G01N 29/26 |
| | | | | 73/638 |

(Continued)

FOREIGN PATENT DOCUMENTS

| | | |
|---|---|---|
| CN | 101002087 A | 7/2007 |
| CN | 101748941 A | 6/2010 |

(Continued)

OTHER PUBLICATIONS

"Chinese Application Serial No. 201811261579.1, Office Action dated Jan. 4, 2021", 16 pgs.

(Continued)

*Primary Examiner* — Helen C Kwok
*Assistant Examiner* — Nashmiya S Fayyaz
(74) *Attorney, Agent, or Firm* — Schwegman Lundberg & Woessner, P.A

(57) ABSTRACT

An ultrasound probe assembly comprises a housing and a wedge, wherein wedges configured for pipes of different diameter may be easily interchanged in the assembly. Four wheels are attached to the housing, there being a front wheel pair and a rear wheel pair. Wheels of each pair are positioned on either side of a linear probe array, wherein the distance between wheels in each pair in a direction perpendicular to the array length is as small as possible. A position encoder monitors the position of the assembly during scanning, and a push lock switch is used to disable the encoder and the data acquisition while indexing to a new scan position on the pipe.

20 Claims, 10 Drawing Sheets

(51) Int. Cl.
*G01N 29/28* (2006.01)
*G01N 29/22* (2006.01)

(52) U.S. Cl.
CPC ......... *G01N 29/2487* (2013.01); *G01N 29/28* (2013.01); *G01N 2291/0289* (2013.01); *G01N 2291/106* (2013.01); *G01N 2291/2634* (2013.01); *G01N 2291/2638* (2013.01)

(58) Field of Classification Search
CPC ............... G01N 29/225; G01N 29/226; G01N 29/2487; G01N 29/265; G01N 29/28
USPC ...................................... 73/592, 644, 40.5 A
See application file for complete search history.

(56) References Cited

U.S. PATENT DOCUMENTS

| | | | | |
|---|---|---|---|---|
| 7,984,650 | B2 * | 7/2011 | Brignac | G01N 29/262 |
| | | | | 73/618 |
| 10,564,131 | B2 | 2/2020 | Badeau et al. | |
| 2009/0314089 | A1 | 12/2009 | Brignac et al. | |
| 2014/0102201 | A1 * | 4/2014 | Brignac | G01N 29/2462 |
| | | | | 73/592 |
| 2019/0128851 | A1 * | 5/2019 | Wells | G01N 29/2487 |

FOREIGN PATENT DOCUMENTS

| | | |
|---|---|---|
| CN | 102343585 A | 2/2012 |
| CN | 103728372 A | 4/2014 |
| CN | 103995059 A | 8/2014 |
| CN | 205384246 U | 7/2016 |
| CN | 107014908 A | 8/2017 |
| CN | 206542668 U | 10/2017 |
| CN | 109725057 A | 5/2019 |
| EP | 2138838 A2 | 12/2009 |
| EP | 3477297 A1 | 5/2019 |

OTHER PUBLICATIONS

"European Application Serial No. 18201971.1, Extended European Search Report dated Feb. 14, 2019", 8 pgs.

"European Application Serial No. 18201971.1, Response filed Nov. 1, 2019 to Extended European Search Report dated Feb. 14, 2019", 9 pgs.

"Chinese Application Serial No. 201811261579.1, Office Action dated Sep. 24, 2021", with English claims, 19 pgs.

"Chinese Application Serial No. 201811261579.1, Response filed Jul. 16, 2021 to Office Action dated Jan. 4, 2021", w/ English Claims, 19 pgs.

"Chinese Application Serial No. 201811261579.1, Decision of Rejection dated Apr. 8, 2022", with English claims, 10 pgs.

"Chinese Application Serial No. 201811261579.1, Office Action dated Jan. 27, 2022", with English translation of claims, 17 pgs.

"Chinese Application Serial No. 201811261579.1, Response filed Mar. 22, 2022 to Office Action dated Jan. 27, 2022", w/ English Claims, 20 pgs.

"Chinese Application Serial No. 201811261579.1, Response filed Nov. 30, 2021 to Office Action dated Sep. 24, 2021", w/English claims, 16 pgs.

"European Application Serial No. 18201971,1, Communication Pursuant to Article 94(3) EPC dated Dec. 14, 2021", 6 pgs.

"European Application Serial No. 18201971.1, Response filed Apr. 14, 2022 to Communication Pursuant to Article 94(3) EPC dated Dec. 14, 2021", 35 pgs.

* cited by examiner

ULTRASONIC SCANNER WITH INTERCHANGEABLE WEDGE AND FLEXIBLE PROBE

CROSS-REFERENCE TO RELATED APPLICATIONS

This application claims the benefit and priority of U.S. Provisional patent application Ser. No. 62/578,050 filed Oct. 27, 2017, entitled ULTRASONIC SCANNER WITH INTERCHANGEABLE WEDGE AND FLEXIBLE PROBE, the entire disclosure of which is incorporated herein by reference.

FIELD OF THE INVENTION

The invention relates in general to non-destructive test and inspection of pipes and pipe elbows with ultrasound, and in particular to an ultrasound probe assembly suited for such inspection.

BACKGROUND OF THE INVENTION

Inspection of pipe elbows is a difficult problem because of the constraints imposed by the elbow geometry. One solution is to remove the elbow for inspection, for example by X-ray techniques. However, in situ inspection techniques are clearly preferred.

Ultrasound inspection of pipe elbows is performed in current practice, but such inspection is performed only with a single element ultrasound probe. Inspection with a single element probe is a lengthy and tedious process, and there is generally no capability to map the location of defects in an inspected elbow.

There therefore exists a need for an ultrasound inspection device which uses a linear phased array probe capable of performing defect mapping.

SUMMARY OF THE INVENTION

Accordingly, it is a general objective of the present disclosure to provide an ultrasound array probe assembly capable of reliably mapping defects at a pipe elbow.

This and other objectives are achieved by means of an ultrasound probe assembly comprising at least one wedge, an acoustic probe and a probe holder, the probe holder comprising a holder housing having an open position to receive and a closed position to removably hold a one of the at least one wedge, each one of the at least one wedge being compatible with a respective testing surface, the holder housing comprising a first housing portion and a second housing portion configured to, in combination with the first housing portion, removably hold the wedge.

DETAILED DESCRIPTION OF PREFERRED EMBODIMENT

The process of mapping defects in a pipe elbow is difficult to carry out for the following reasons:

1) The probe must be moved with reliable positioning over all parts of the pipe elbow, namely the inside corner, the outside corner and the intermediate region.
2) The longitudinal direction of the probe array length needs to remain substantially concentric to the axis of the elbow throughout each axial scan parallel to the pipe central axis.
3) The distance between the probe and the pipe surface (the couplant path length) must remain reasonably constant throughout the axial scan.

Figure 1:
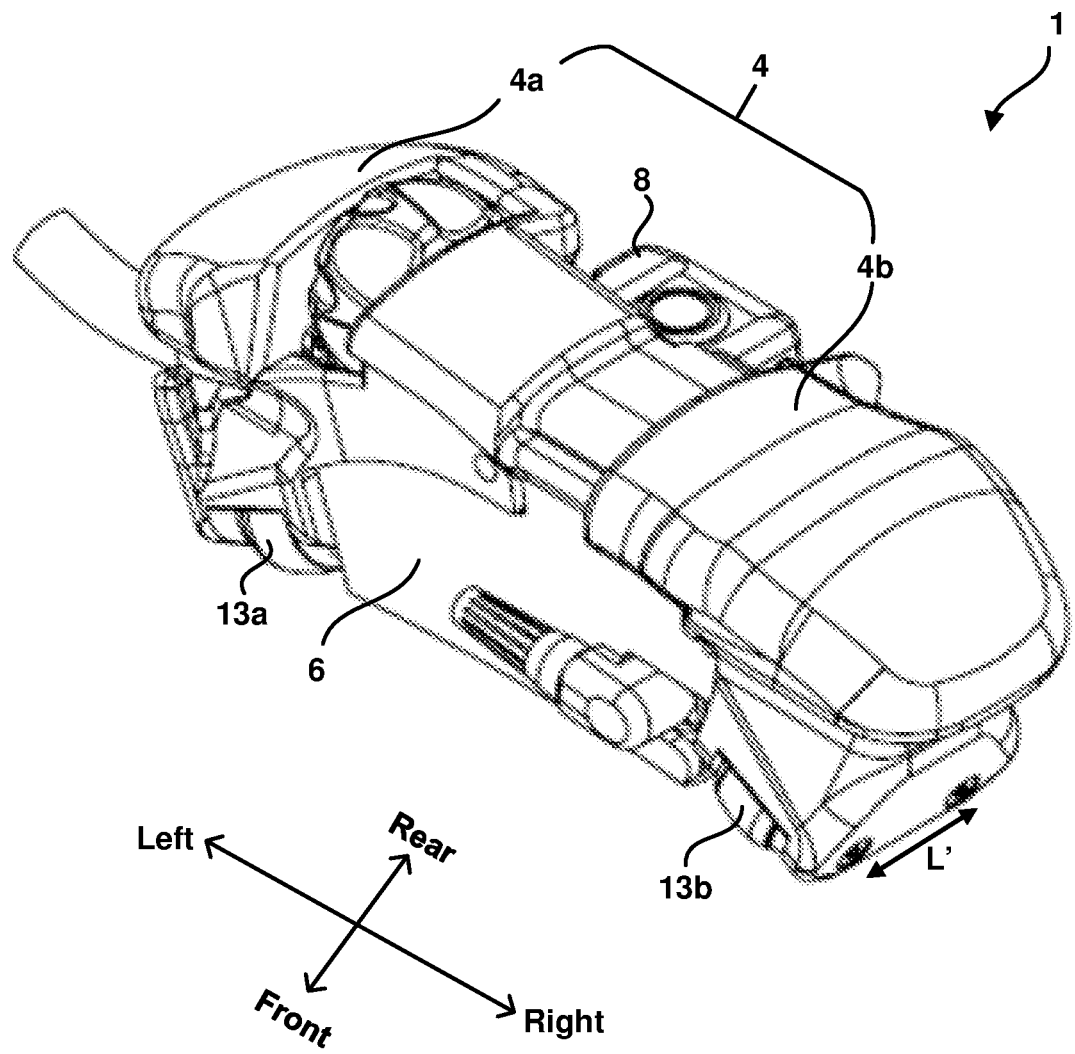
FIG. 1 is an isometric diagram of an ultrasound probe assembly according to the present disclosure.

FIG. 1 shows an isometric view of an ultrasound probe assembly 1. FIG. 1 also shows a directional key, showing use throughout this disclosure of conventions for left, right, front and rear directions. Note that use of the directional key is only for purposes of clear exposition and is in no way intended to be restrictive or to limit the scope of the present disclosure.

Figure 2:
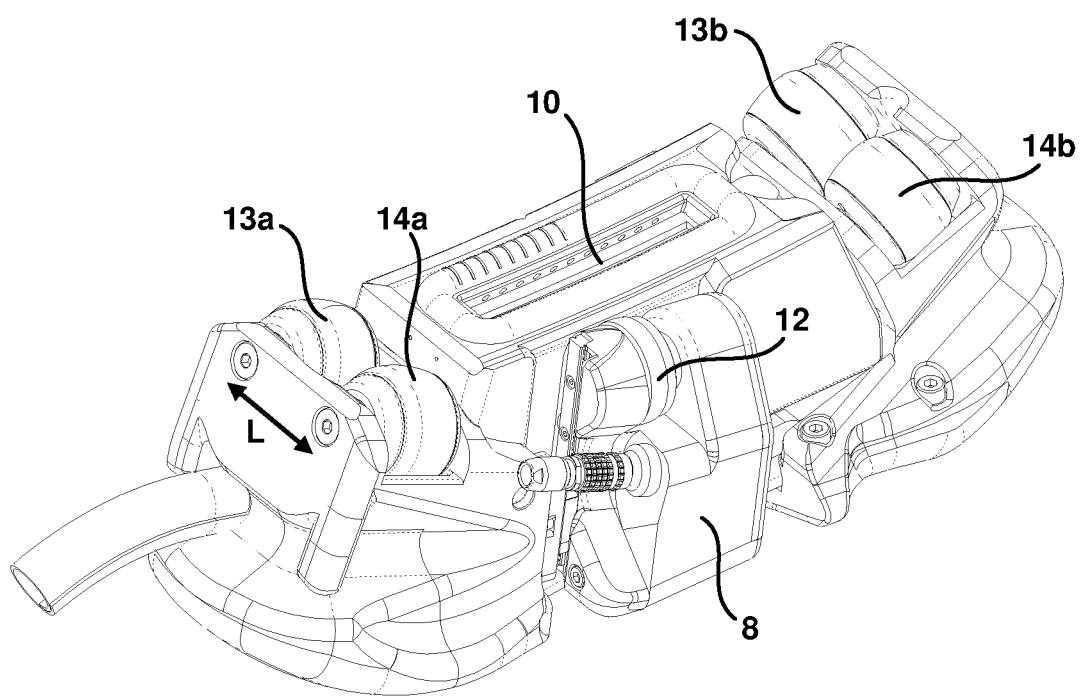
FIG. 2 is an underside view of the ultrasound probe assembly according to the present disclosure.

As shown in FIG. 1, ultrasound probe assembly 1 comprises a wedge 6, a housing 4 and an encoder assembly 8. Housing 4 comprises a left housing portion 4a and a right housing portion 4b. FIG. 2 is an underside view of ultrasound probe assembly 1 showing wheels 13a, 13b, 14a and 14b, and the location of an acoustic probe 10.

Referring to FIGS. 1 and 2, it is seen that housing 4 rides on four rotatable wheels: a front left wheel 13a, a front right wheel 13b, a rear left wheel 14a and a rear right wheel 14b. In an embodiment, the wheels may be magnetic to ensure that the probe assembly remains rigidly attached when scanning a pipe made of magnetic material, such as steel. There is a first wheel axial separation L between wheels 13a and 14a, and a second wheel axial separation L' between wheels 13b and 14b. Wheel axial separations L and L' are designed to be as small as possible, and in an embodiment L is equal to L'. In a further embodiment, L and L' are both less than four inches and, in a preferred embodiment, L and L' are both less than two inches. Note that when ultrasound probe assembly 1 is in use, wheel axial separations L and L' are oriented substantially parallel to the central axis of the pipe or pipe elbow.

Use of four wheels on ultrasound probe assembly 1, with two wheels on each side of acoustic probe 10, and small wheel axial separations L and L', has the following advantages for scanning a pipe elbow:

1. It is important that during the scan the orientation of the longitudinal direction of acoustic probe 10 should remain closely concentric with the central axis of the elbow. In an embodiment, the tolerance for concentricity may be ±3°. Small wheel axial separations L and L' allow such tolerance of concentricity to be more easily maintained. In a preferred embodiment, L and L' are both 1.3 inches. The inventors of the present disclosure have found that values of L smaller than about 1.3 inches may compromise the stability of ultrasound probe assembly 1 when scanning on a straight pipe. On the other hand, larger values of L or L' may compromise the concentricity of the longitudinal direction of acoustic probe 10 when scanning on the inside or outside surface of a pipe elbow, and may also result in an undesirably large value of the couplant path length D (see FIG. 6). In general it is desirable that axial separation L or L' should be less than two inches.
2. The couplant path length D between the emitting surface of acoustic probe 10 and the pipe surface should be kept constant throughout the scan. Small wheel axial separations L and L' allow a constant couplant path length to be more easily maintained.
3. Use of two wheels on each side of acoustic probe 10 allows the probe assembly to be easily manipulated over all parts of the pipe elbow, namely the inside corner, the outside corner and intermediate locations.

When in use, ultrasound probe assembly 1 is scanned from front to rear in an axial scanning direction which is substantially parallel to the pipe central axis. At completion of a scan, the user moves ultrasound probe assembly 1 in a circumferential pipe direction, either from left to right or from right to left, such that, at the end of the circumferential move, ultrasound probe assembly 1 is located at the next circumferential location for axial scanning. The procedure of moving the probe assembly to the next circumferential location is referred to as "scan indexation".

Figure 3A:
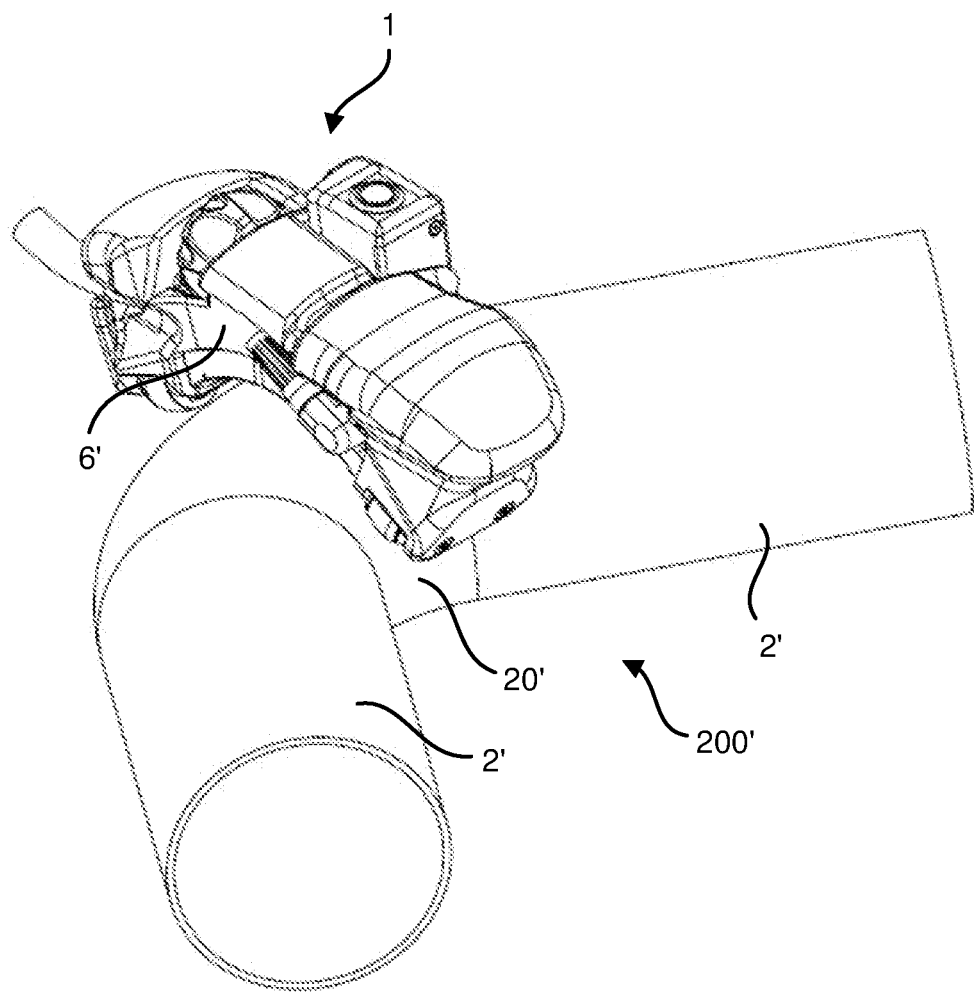
FIG. 3A is a diagram of the ultrasound probe assembly located on a pipe elbow.
Figure 3B:
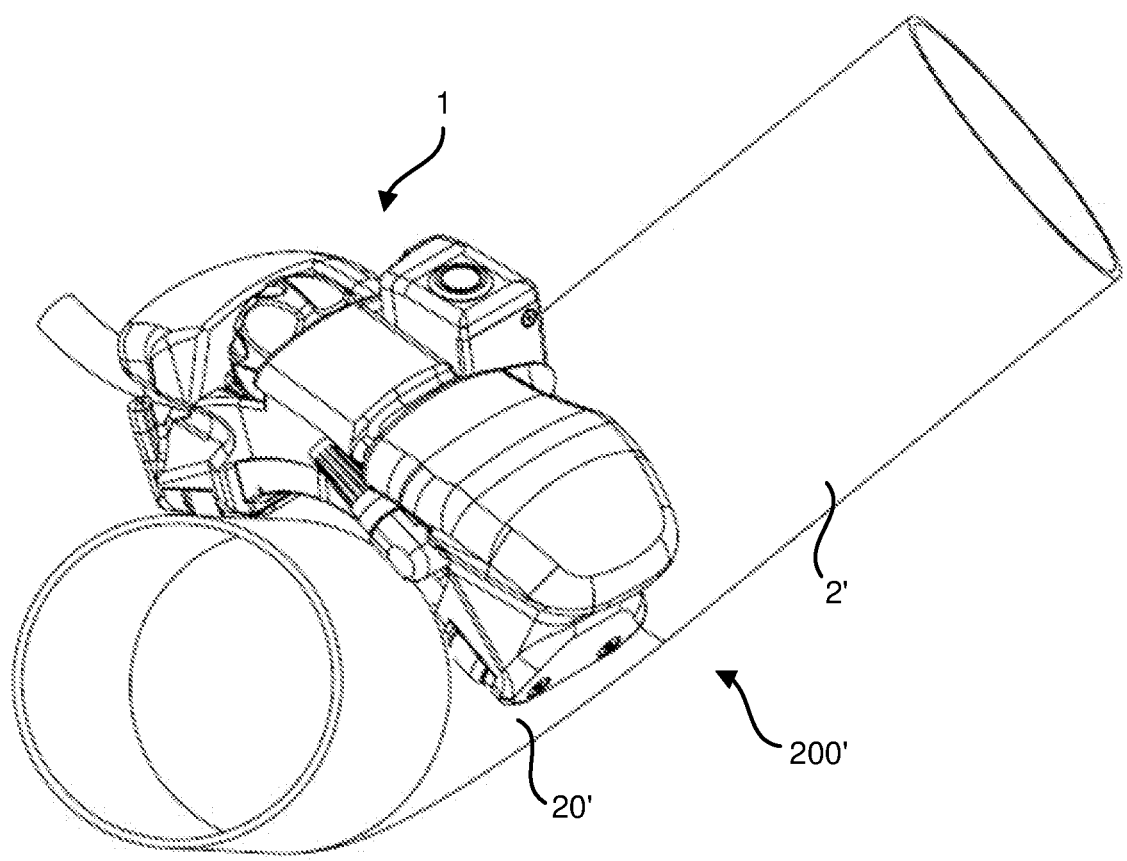
FIG. 3B is a diagram of the ultrasound probe assembly located on an inside corner of a pipe elbow.
Figure 3C:
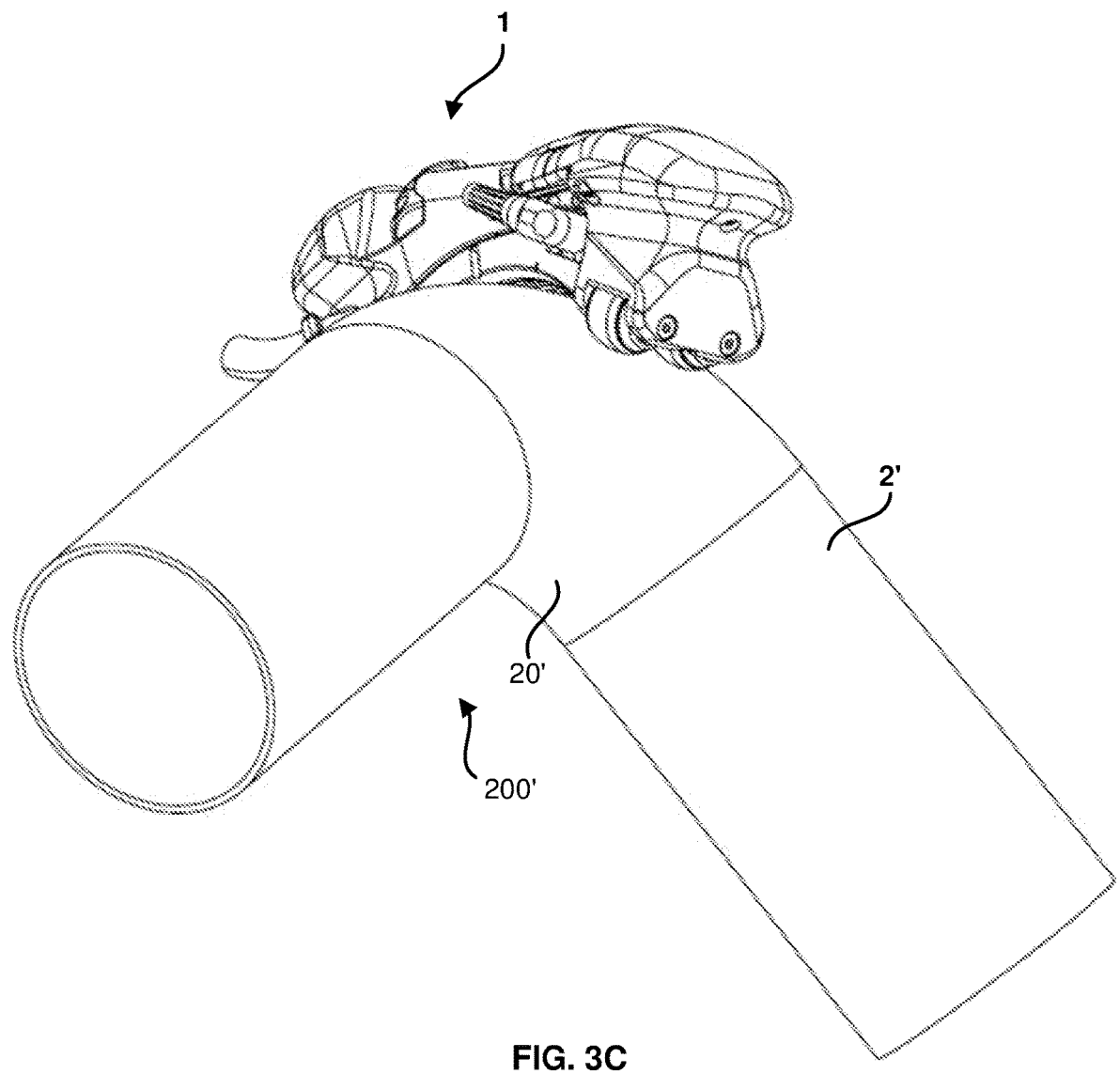
FIG. 3C is a diagram of the ultrasound probe assembly located on an outside corner of a pipe elbow.

FIG. 3A shows ultrasound probe assembly 1 located on a pipe assembly 200' comprising two pipes 2' joined by a pipe elbow 20', wherein ultrasound probe assembly 1 comprises a wedge 6' configured for the diameter of pipe assembly 200'. FIG. 3B shows ultrasound probe assembly 1 located on the inside corner of pipe elbow 20' of pipe assembly 200', and FIG. 3C shows ultrasound probe assembly 1 located on the outside corner of pipe elbow 20' of pipe assembly 200'.

Figure 4A:
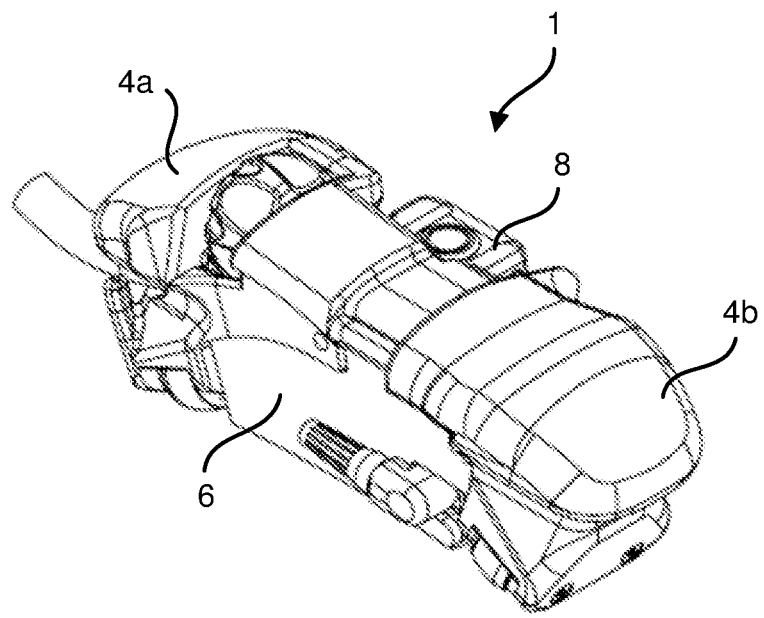
FIG. 4A is a diagram of the ultrasound probe assembly with an inserted wedge and the housing in the closed position.
Figure 4B:
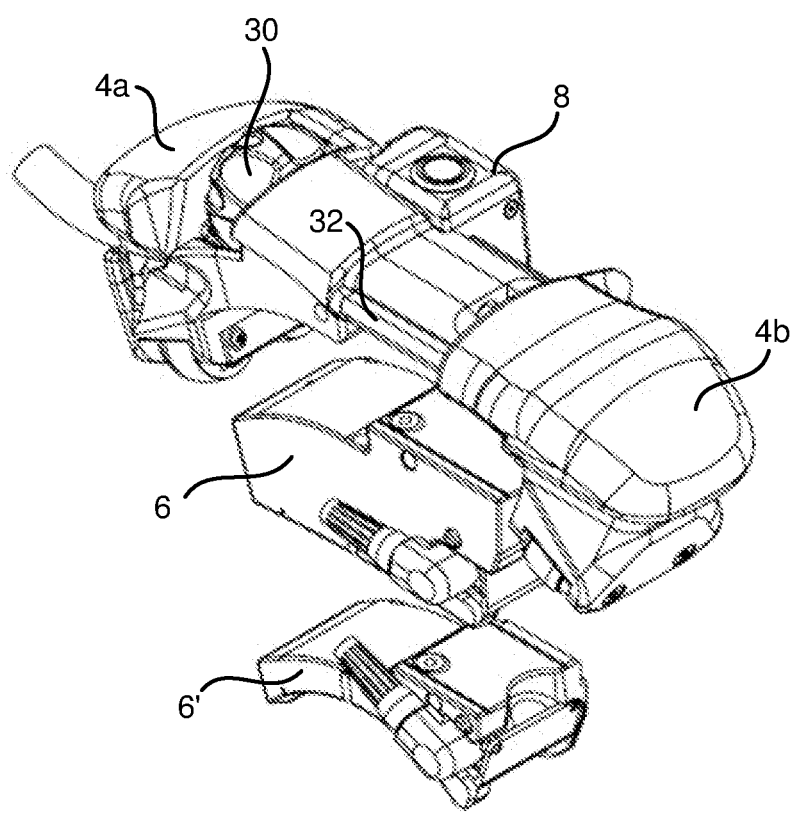
FIG. 4B is a diagram of the ultrasound probe assembly with the housing in the open position, showing two different wedges capable of insertion into the housing.

FIGS. 4A and 4B illustrate the ability of ultrasound probe assembly 1 to integrate different wedges adapted for pipes of different diameter, ranging from a wedge for inspection of a two inch diameter pipe to a wedge for inspection of a flat surface. FIG. 4A illustrates ultrasound probe assembly 1 with housing 4 in the closed position and integrated with wedge 6 configured for a 48 inch diameter pipe assembly 200 (see FIG. 8). FIG. 4B shows ultrasound probe assembly 1 with housing 4 in the open position, wherein housing portions 4a and 4b are slidably separated by means of a slide mechanism 32. Also illustrated in FIG. 4B are two alternative wedges, namely wedge 6 configured for 48 inch diameter pipe assembly 200 and wedge 6' configured for 4.5 inch diameter pipe assembly 200', either one of which may be inserted between housing portions 4a and 4b while in the open position. Insertion of the wedge into the correct position within open housing portions 4a and 4b may be assisted by magnets (not shown) incorporated into the wedge. After inserting either wedge 6 or wedge 6' or another wedge configured for any pipe diameter greater than about 2 inches, housing portions 4a and 4b are slidably moved to the closed position, thereby capturing the wedge between housing portions 4a and 4b. In order to securely hold housing portions 4a and 4b in the closed position, a knob 30 located in left housing portion 4a is manually rotated, thereby rotating a screw or other device (not shown) which engages with right housing portion 4b, locking housing portions 4a and 4b securely together in the closed position.

Note that use of slide mechanism 32 is a preferred embodiment, but other embodiments such as a screw mechanism (not shown), are possible. The general requirement is for a holder housing having an open position to receive and a closed position to removably hold a wedge compatible with a testing surface, the holder housing comprising a first housing portion and a second housing portion configured to, in combination with the first housing portion, removably hold the wedge.

It should be noted that the ability to integrate simple wedges adapted for different diameter pipes is an important aspect of the present disclosure. The solution in which housing portions 4a and 4b slide to an open or closed position to integrate different wedges has the following advantages:

The mechanism is easy to use.
The assembly is robust against rough handling.
The solution allows use of simple, low cost wedges—components required for scanning are not required on the wedges.
The solution enables rapid wedge changes, allowing easy adaptation to pipes of different diameters.

Figure 5:
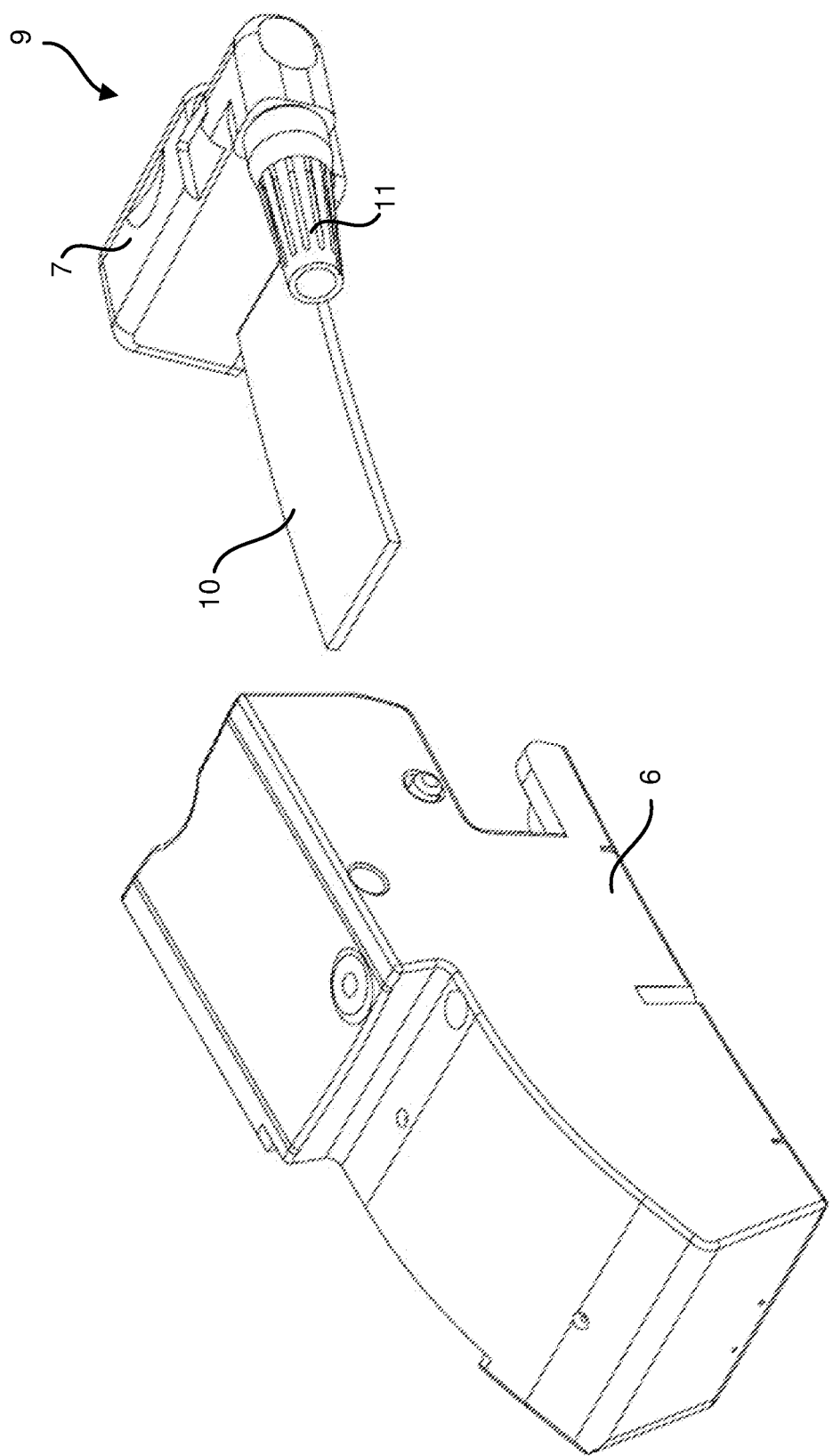
FIG. 5 is an exploded view of a wedge showing insertion of an acoustic probe assembly according to the present disclosure.

FIG. 5 illustrates wedge 6 and an acoustic probe assembly 9. Acoustic probe assembly 9 comprises flexible acoustic probe 10 which comprises an acoustic probe array (not shown) mounted on a flexible circuit board (also not shown). Note that the emitting surface of acoustic probe 10 is on its underside in FIG. 5 as shown. Electrical connections from acoustic probe 10 to a probe cable 11 are made within a probe casing 7. Probe cable 11 thereby carries electrical connections from the elements of the acoustic probe array within acoustic probe 10 to a data acquisition unit (not shown).

Note that acoustic probe assembly 9 is an independent unit which may be inserted into wedge 6, and that wedge 6 may be configured for any pipe diameter from 2 inches to a flat surface. Wedge 6 is configured for a particular pipe diameter, and since acoustic probe 10 is flexible, it is able to conform to the shape of a slot 52 (see FIG. 6) within wedge 6 in the manner described in co-pending U.S. patent application Ser. No. 15/602,419, assigned to the assignee of the present disclosure.

Since there is no requirement to include either an acoustic probe assembly or a scanner mechanism, wedge 6 may be a simple, low cost wedge part. It is an important aspect of the present disclosure that ultrasound probe assembly 1 may be easily integrated with different wedges configured for different pipe diameters, and that each of these wedges is compatible with a common acoustic probe assembly 9 having flexible acoustic probe 10. Thus, inspection of different pipe diameters is achieved with significant reduction of equipment cost and with significantly enhanced flexibility of operation.

Figure 6:
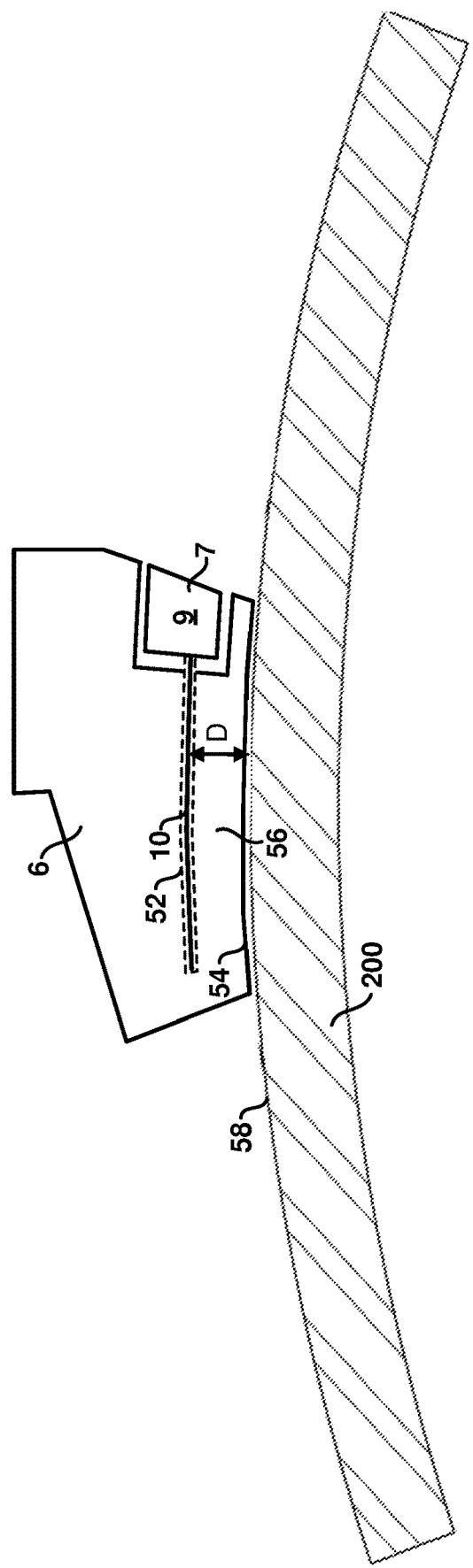
FIG. 6 is a schematic cross-sectional diagram of a wedge on a pipe surface, showing location of the slot and inserted acoustic probe.

FIG. 6 is a schematic illustration of wedge 6 having a wedge surface 54 in contact with a testing surface 58 of 48 inch pipe assembly 200. Wedge surface 54 is in the form of a wedge surface arc which has the same diameter as pipe assembly 200 and therefore conforms to testing surface 58. Acoustic probe assembly 9 is inserted into wedge 6, such that flexible acoustic probe 10 is slidably inserted into slot 52 within wedge 6. Note that wedge surface 54 is substantially conformal with testing surface 58, and that slot 52 has a slot arc shape which is concentric with wedge surface 54 and with testing surface 58. After insertion into slot 52, flexible acoustic probe 10 has the slot arc shape and is also concentric with pipe surface 58. The slot arc shape corresponds to a diameter which is greater than the pipe diameter, such that there is a couplant space 56 with a couplant path length D between the two concentric surfaces. Couplant space 56 between flexible acoustic probe 10 and pipe surface 58 is filled with a couplant fluid, allowing good acoustic coupling of flexible acoustic probe 10 to pipe assembly 200. In an embodiment, couplant path length D may be approximately 9 mm.

Note that, for simplicity of presentation, housing 4, wheels 13a, 13b, 14a and 14b, and gaskets 42 and 44 have all been omitted from FIG. 6.

Figure 7A:
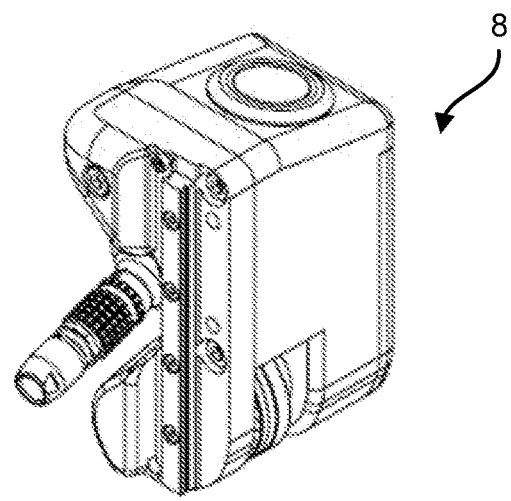
FIG. 7A is an isometric view of an encoder assembly according to the present disclosure.
Figure 7B:
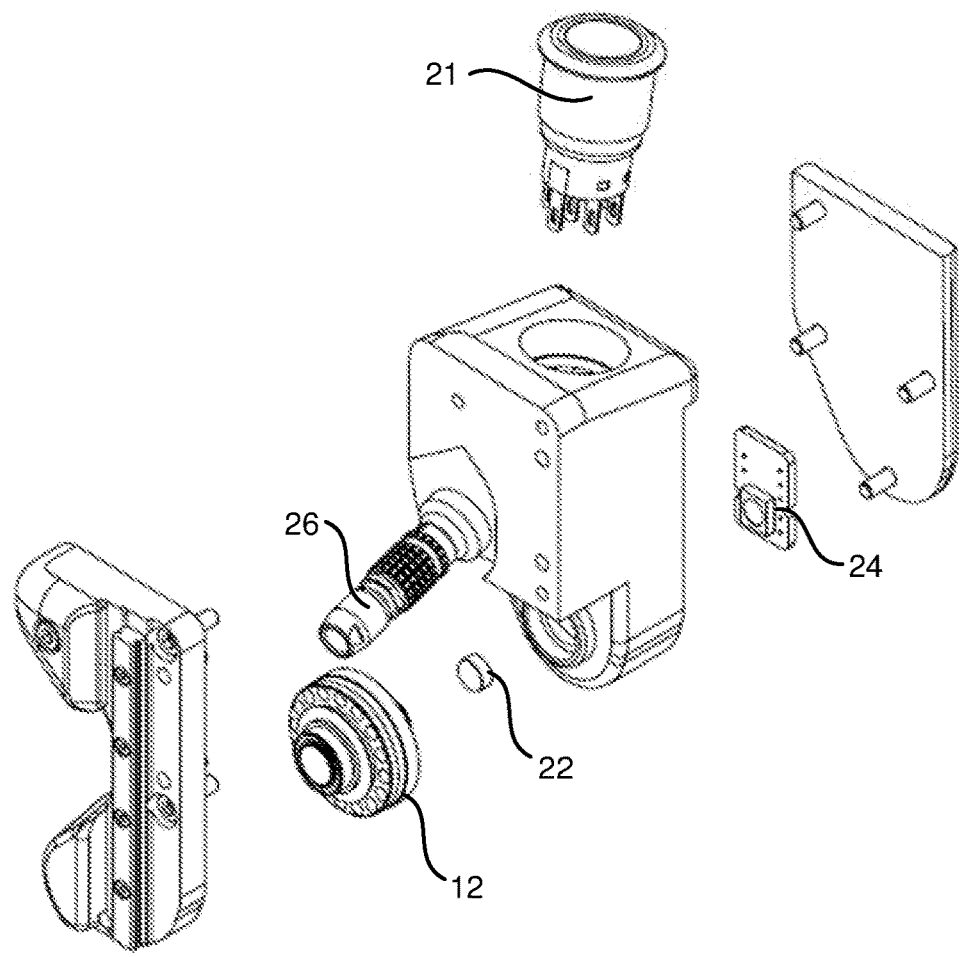
FIG. 7B is an exploded view of the encoder assembly according to the present disclosure.

Referring again to FIG. 2, also shown is an encoder wheel 12 which is part of encoder assembly 8. FIG. 7A is an isometric view and FIG. 7B is an exploded view of encoder assembly 8. The function of encoder assembly 8 is to transmit position encoding information representative of the axial location of ultrasound probe assembly 1, wherein the axial direction is defined as a direction parallel to the central axis of a pipe or pipe elbow. Note that the pipe central axis may be a straight line in the case of a straight pipe, but may be curved in the case of a pipe elbow. Position information is obtained by rotation of encoder wheel 12 which is in contact with the surface of the elbow or pipe throughout the axial scan. Encoder wheel 12 is coupled to an encoder magnet 22 whose rotation is sensed by an encoder board 24 which transmits encoding information via an encoder cable 26.

An on-off push locking switch 21 is integrated into encoder system 8. Upon completion of an axial scan, switch 21 is manually depressed by the user. When switch 21 is depressed, data acquisition from both acoustic probe 10 and encoder 8 is deactivated. The user may then perform scan indexation, moving ultrasound probe assembly 1 to the next scan position, the scan indexation motion being in a circumferential pipe direction. When the next scan position is reached, the user releases push switch 21, the acquisition system increments the circumferential location of the probe assembly by a pre-selected indexation step amount, and the acquisition and encoding systems resume operation. Deactivating the encoder and probe data acquisition eliminates the risk of encoding error during the indexation step. In the absence of such deactivation, the encoder and the probe acquisition systems are acquiring false data. In particular, encoder wheel 12 may be inadvertently rotated during indexation, causing a major positioning error at the next scanning step. As a result of the deactivation feature of the present disclosure, the encoding measurement is more accurate, and there is no encoding error or bad probe data due to the indexation process. Push switch 21 may be linked to a LED or other indication device which is illuminated when push switch 21 is depressed, in order to alert the user that indexation is in process and that data acquisition and positioning encoding have been deactivated.

Figure 8A:
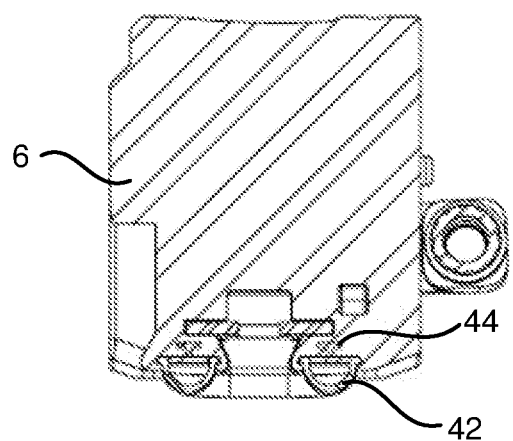
FIG. 8A is a section view of a wedge showing couplant seals according to the present disclosure.
Figure 8B:
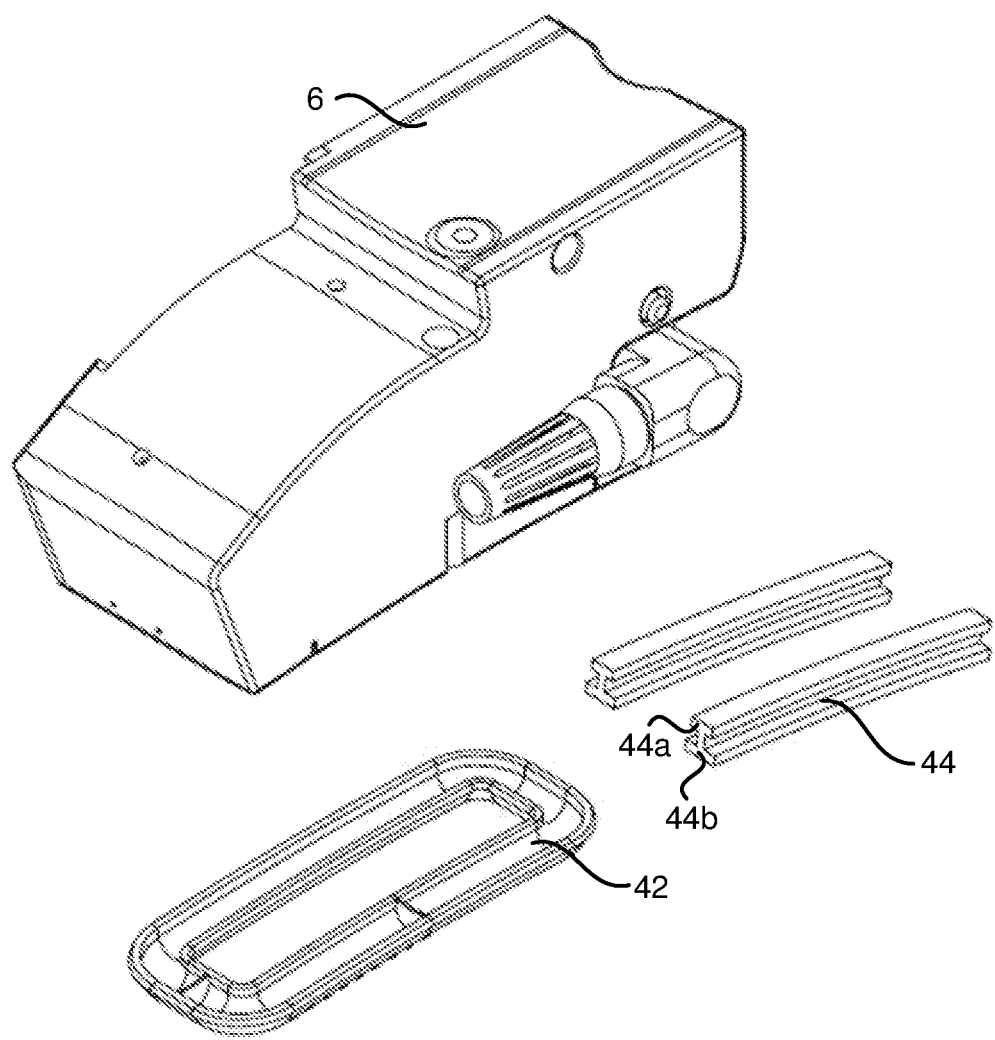
FIG. 8B is an exploded isometric view of a wedge showing couplant seals according to the present disclosure.

FIGS. 8A and 8B show section and exploded views respectively of couplant seals 42 and 44 which are integrated into wedge 6. A custom seal 42 makes contact with the surface of the pipe under inspection, thereby providing a seal to confine the couplant between the wedge and the pipe surface. In an embodiment, the couplant may be water. The design of custom seal 42 makes it easily manufacturable by a molding process, and it provides a reliable seal with low compressive force. The material of custom seal 42 is chosen to provide a low friction contact with the pipe surface, but custom seal 42 will not easily be scratched or damaged by contact with a rough pipe surface. Custom seal 42 may be made of an elastomer material, including but not limited to silicone, polyurethane, nitrile rubber (NBR), ethylene propylene diene monomer rubber (EPDM), Neoprene or Fluoroelastomer material. Custom seal 42 may also be made of a foam-like material, including but not limited to Polyethylene and Polyurethane.

Custom seal 42 is held in place on wedge 6 by locking seals 44, each locking seal having an upper end 44a and a lower end 44b, wherein upper end 44a is inserted into wedge 6 and lower end 44b is inserted into custom seal 42 thereby locking custom seal 42 in place. This arrangement of custom seal 42 and locking seals 44 makes the seals easy to remove and replace, and allows seals of the same design to be used over the whole range of pipe diameters.

Although the present invention has been described in relation to particular embodiments thereof, it can be appreciated that various designs can be conceived based on the teachings of the present disclosure, and all are within the scope of the present disclosure.

What is claimed is:

1. A non-destructive testing or inspection (NDT/NDI) probe assembly comprising:
   a removable flexible ribbon-shaped acoustic probe;
   a holder housing, having an open position to receive and a closed position to hold one of a plurality of removable wedges, respective ones amongst the plurality of removable wedges being compatible with a respective testing surface and the respective ones amongst the plurality of removable wedges each comprising a slot to hold the removable flexible ribbon-shaped acoustic probe, the removable flexible ribbon-shaped acoustic probe conforming to a shape of the slot and compatible with different respective ones of the plurality of removable wedges, the holder housing comprising:
   a first housing portion;
   a second housing portion configured to, in combination with the first housing portion, hold the one of the plurality of removable wedges; and
   a slide over which at least one of the first or second housing portions can be positioned;
   wherein the first housing portion is configured to slide relative to the second housing portion along a long axis of the probe assembly using the slide, providing an open position exposing relatively more of the slide and a closed position exposing relatively less of the slide enclosed by at least one of the first or second housing portions, to accommodate different respective ones amongst the plurality of removable wedges between the first and second housing portions.

2. The NDT/NDI probe assembly of claim 1, wherein the holder housing is configured to hold a first removable wedge of the plurality of removable wedges when the probe assembly is in a first configuration, and to hold a different, second removable wedge of the plurality of removable wedges when the probe assembly is in a second configuration.

3. The NDT/NDI probe assembly of claim 1, wherein the respective testing surface is a surface of one of a pipe or a pipe elbow.

4. The NDT/NDI probe assembly of claim 1, wherein the slot comprises a slot arc shape compatible with the respective testing surface.

5. The NDT/NDI probe assembly of claim 1, further comprising scanner wheels rotatably attached to the holder housing, the scanner wheels in contact with a surface under inspection, thereby facilitating a scanning motion of the probe assembly.

6. The NDT/NDI probe assembly of claim 5, wherein the scanner wheels are configured to facilitate the scanning motion in an axial scanning direction, wherein the axial scanning direction is parallel to a central axis of one of a pipe or a pipe elbow, the scanner wheels comprising:
a left wheel pair having a front left wheel on a front side of the acoustic probe and a rear left wheel on a rear side of the acoustic probe, wherein the front left wheel and the rear left wheel are separated by a wheel axial separation; and,
a right wheel pair having a front right wheel on the front side of the acoustic probe and a rear right wheel on the rear side of the acoustic probe, wherein the front right wheel and the rear right wheel are separated by the wheel axial separation; and,
wherein the left wheel pair is on a left side of the central axis during the scanning motion, and the right wheel pair is on a right side of the central axis during the scanning motion.

7. The NDT/NDI probe assembly of claim 6, wherein the scanner wheels comprise magnets generating a magnetic attractive force between the scanner wheels and the surface under inspection.

8. The NDT/NDI probe assembly of claim 6, wherein the wheel axial separation is less than two inches.

9. The NDT/NDI probe assembly of claim 5, further comprising an encoder assembly, the encoder assembly comprising:
an encoder wheel in contact with the surface under inspection, the scanning motion causing an encoder wheel rotation, the encoder wheel rotation configured to transmit a position encoding information of the scanning motion.

10. The NDT/NDI probe assembly of claim 5, wherein a couplant fluid is located in a couplant space between an emitting surface of the removable flexible ribbon-shaped acoustic probe and the surface under inspection, the couplant fluid facilitating an acoustic transmission between the emitting surface and the surface under inspection.

11. The NDT/NDI probe assembly of claim 10, wherein respective ones of the plurality of removable wedges further comprise a respective wedge surface to be coupled with the surface under inspection, the respective wedge surface having an integrated couplant seal configured to seal the couplant fluid in the couplant space.

12. A non-destructive testing or inspection (NDT/NDI) probe assembly comprising:
a removable flexible ribbon-shaped acoustic probe;
a first removable wedge comprising a slot to hold the removable flexible ribbon-shaped acoustic probe, the flexible ribbon-shaped acoustic probe compatible with different respective ones amongst a plurality of removable wedges, the different respective ones each comprising a slot to hold the removable flexible ribbon-shaped acoustic probe, the flexible ribbon-shaped acoustic probe conforming to a shape of the slot; and
a probe holder, the probe holder comprising:
a holder housing having an open position to receive and a closed position to hold the first removable wedge, the holder housing adjustable to accommodate the different respective ones of the plurality of removable wedges including the first removable wedge, the different respective ones amongst the plurality of removable wedges being compatible with a respective testing surface, the holder housing comprising:
a first housing portion; and
a second housing portion configured to, in combination with the first housing portion, hold the first removable wedge when the first and second housing portions are in the closed position to capture a respective one of the plurality of removable wedges;
wherein the first housing portion is configured to slide relative to the second housing portion along a long axis of the probe holder, using a slide over which at least one of the first or second housing portions can be positioned, providing an open position exposing relatively more of the slide and a closed position exposing relatively less of the slide enclosed by at least one of the first or second housing portions, to accommodate different respective ones amongst the plurality of removable wedges between the first and second housing portions.

13. The NDT/NDI probe assembly of claim 12, wherein the holder housing is configured to hold the first removable wedge of the plurality of removable wedges when the probe holder is in a first configuration and hold a different, second removable wedge of the plurality of removable wedges when the probe holder is in a second configuration.

14. The NDT/NDI probe assembly of claim 12, wherein the respective testing surface is a surface of one of a pipe or a pipe elbow.

15. The NDT/NDI probe assembly of claim 12, wherein the slot of the first wedge further comprises a slot arc shape compatible with the respective testing surface.

16. The NDT/NDI probe assembly of claim 12 further comprising scanner wheels rotatably attached to the holder housing, the scanner wheels in contact with the respective testing surface, facilitating a scanning motion of the probe holder.

17. The NDT/NDI probe assembly of claim 1, comprising a knob actuatable by a user to secure the first and second housing portions relative to each other.

18. The NDT/NDI probe assembly of claim 12, comprising a knob actuatable by a user to secure the first and second housing portions relative to each other.

19. The NDT/NDI probe assembly of claim 1, comprising an electrical switch actuatable by a user to trigger inhibition of at least one of acoustic acquisition or movement encoding of the probe holder.

20. The NDT/NDI probe assembly of claim 12, comprising an electrical switch actuatable by a user to trigger inhibition of at least one of acoustic acquisition or movement encoding of the probe assembly.

* * * * *